Inventor
ERNEST WILDHABER

Oct. 6, 1953　　　　　E. WILDHABER　　　　　2,654,456
POSITIVE CLUTCH WITH HELICOIDAL
TOOTH SURFACES OF VARYING LEAD
Original Filed Jan. 4, 1943　　　　　　　　　　2 Sheets-Sheet 2
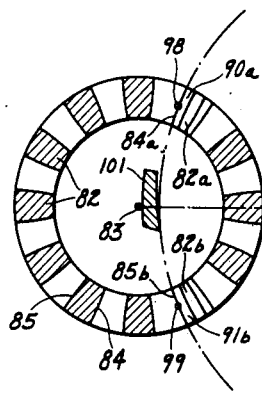
Fig. 7
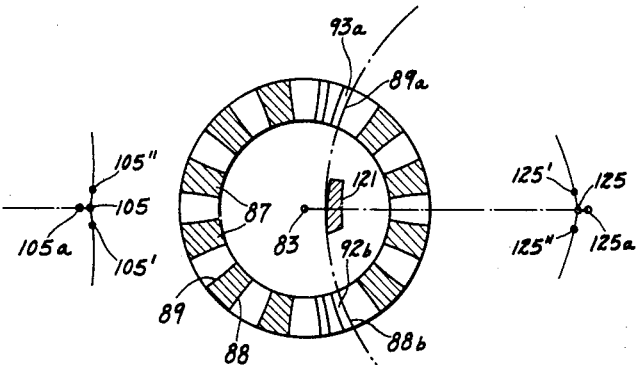
Fig. 10
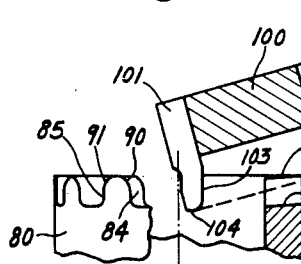
Fig. 8
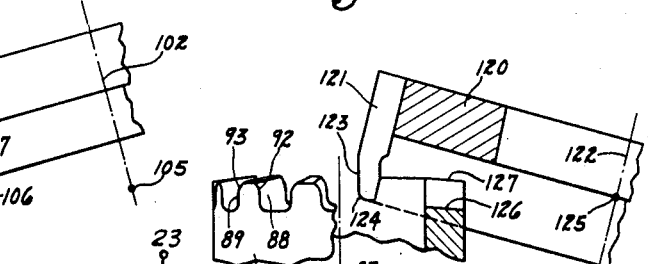
Fig. 11
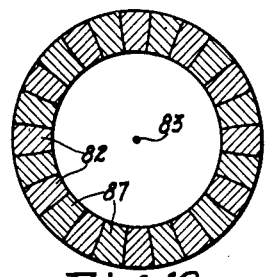
Fig. 12
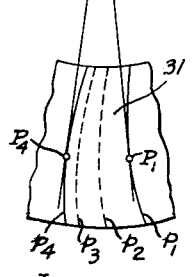
Fig. 16　Fig. 17
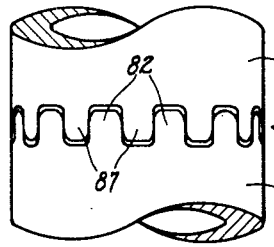
Fig. 13
Fig. 15
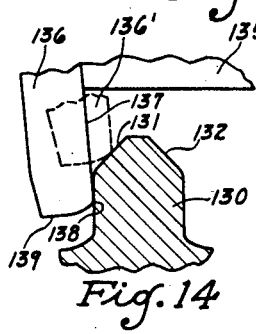
Fig. 14
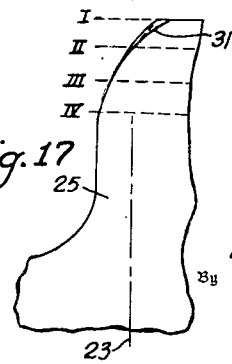
Inventor
ERNEST WILDHABER
By
Attorney

UNITED STATES PATENT OFFICE 2,654,456

POSITIVE CLUTCH WITH HELICOIDAL TOOTH SURFACES OF VARYING LEAD

Ernest Wildhaber, Brighton, N. Y., assignor to Gleason Works, Rochester, N. Y., a corporation of New York Original application January 4, 1943, Serial No. 471,233. Divided and this application April 20, 1948, Serial No. 22,209

14 Claims. (Cl. 192—108)

The present invention relates to toothed face clutches. In particular, the invention relates to the structure and production of clash-type face clutches, that is, clutches whose members are adapted to be engaged while the driver, at least, is rotating. The present application is a division of my copending application, Serial No. 471,233, filed January 4, 1943, now U. S. Patent No. 2,443,089, granted June 8, 1948, and covers specifically the novel clutch of the invention.

Since the teeth and tooth spaces of the two engaging members of a clash-type clutch are not always in exact register when the clutch members are moved into engagement, the teeth of such clutch members are chamfered along their top edges to facilitate engagement. At the beginning of engagement of such clutch members, the loads are high, shock loads, and it is important, therefore, that the chamfered portions of the teeth, as well as the main portions of the teeth, be able to stand and carry heavy loads.

A primary object of the present invention is to provide a toothed face clutch which has chamfer surfaces correctly formed to carry heavy clashing loads. To this end, it is one aim of the invention to provide a toothed face clutch whose members have the chamfered portions of their teeth so shaped that they will contact midway of the length of the chamfered portions and, if desired, along the whole length thereof in all positions of partial engagement of the clutch members as the clutch members move into full engagement.

Another object of the invention is to provide a toothed face clutch of the clash type whose members have chamfered surfaces generated to be conjugate to one another, that is, to have proper paired relationship to one another.

Other objects of the invention will be apparent hereinafter from the specification and from the recital of the appended claims.

Toothed face clutch members constructed according to the preferred embodiment of the present invention have longitudinally curved side tooth surfaces and longitudinally curved chamfered portions, that is, side tooth surfaces and chamfered portions that are curved from one end of each tooth to the other. The side tooth surfaces of each clutch member are surfaces of revolution, while their chamfer surfaces are generated surfaces, usually helicoidal surfaces. The term "helicoidal surface," as used in the present specification and claims, is employed in a broad sense to describe a surface of such as may be produced by a rotating cutting edge which moves along and about an axis and radially of that axis, usually with a varying ratio of angular motion about said axis to axial motion along the axis, the axis, in the instant case being the work axis, and the term "helicoidal motion" is used in a broad sense to describe a motion along and about and radially of an axis. The axis referred to coincides with the clutch axis. When the ratio of angular to axial movement varies, then the surface produced has, of course, a varying lead.

Several different embodiments of the invention are illustrated in the accompanying drawings, in which.

Figure 1:
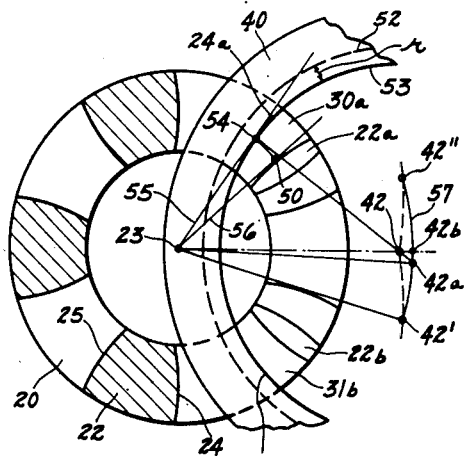
Fig. 1 is a part sectional, part plan view of one member of a clutch pair made according to one embodiment of this invention, and illustrating diagrammatically one method of cutting this clutch member.
Figure 4:
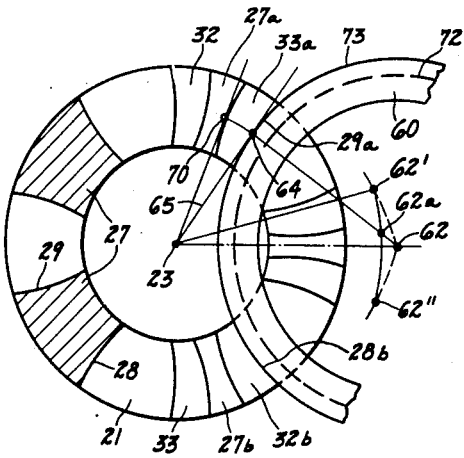
Figs. 4, 5 and 6 are views similar to Figs. 1, 2 and 3, respectively, showing the construction of a clutch member which is to mate with the clutch member of Figs. 1 to 3 inclusive, and illustrating the method of producing this mating clutch member.
Figure 2:
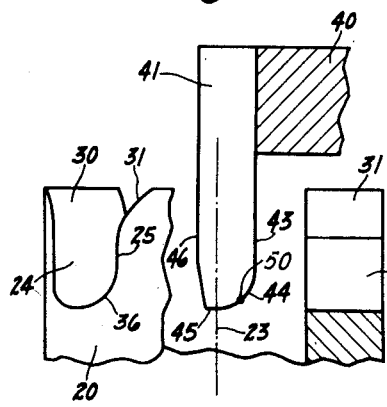
Fig. 2 is a part elevational, part axial sectional view, further illustrating the structure of the clutch member and the process of producing the same.
Figure 5:
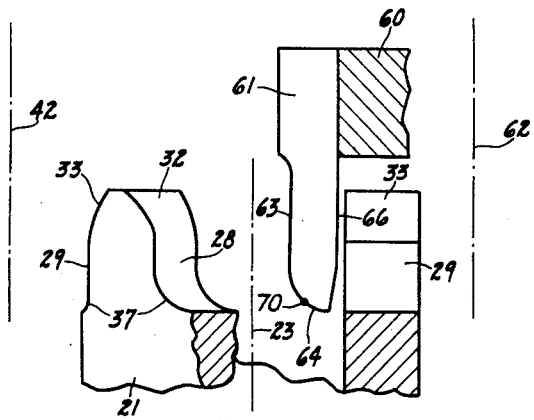
Figure 3:
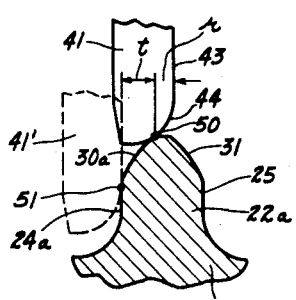
Fig. 3 is a diagrammatic view showing a tooth of the clutch member in a normal section midway of its length and further illustrating the tooth structure and the method of chamfering a side of a tooth.
Figures 6, 9:
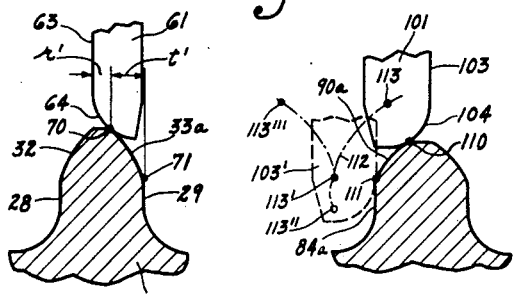

Figs. 7, 8 and 9 are views similar to Figs. 1, 2 and 3, respectively, and illustrating the present preferred method of producing one member of a clutch pair according to this invention, and Figs. 10 and 11 are views similar to Figs. 4 and 5, respectively, illustrating the present preferred method of producing the mating clutch member;

Fig. 12 is a sectional view showing a pair of clutch members made according to this invention in engagement, the section being taken in a mean plane, hereinafter referred to as the pitch plane, which is perpendicular to the clutch axis;

Fig. 13 is a fragmentary elevational view of the engaging clutch members;

Fig. 14 is a view showing a tooth of a clutch member made according to a modification of this invention, and illustrating diagrammatically the method of chamfering the teeth of this clutch member;

Fig. 15 is a normal sectional view, midway of the length of a tooth of a clutch member made according to a still further modification of the invention; and Figs. 16 and 17 are, respectively, a fragmentary plan view and a fragmentary end elevation showing, on a somewhat enlarged scale, a part of a tooth of the clutch member shown in Fig. 1, and illustrating particularly the helicoidal nature of a chamfered surface of this tooth.

Reference will be had first to the embodiment of the invention illustrated in Figs. 1 to 6 inclusive. Here 20 and 21 denote, respectively, the two members of a clutch pair. The clutch members 20 and 21 shown have fewer teeth than would ordinarily be employed, but such members have been shown because the principles underlying the present invention can be more clearly illustrated on the larger scale of the teeth shown.

Clutch member 20 has teeth 22 which extend generally radially of the clutch axis 23 and whose opposite sides 24 and 25 are longitudinally convex, that is, convexly curved from one end of a tooth to the other. The mating clutch member 21 has teeth 27 which extend generally radially of the clutch axis 23 and whose opposite sides 28 and 29 are longitudinally concave, that is, concavely curved from one end of a tooth to the other. The teeth 22 of clutch member 20 are chamfered along their top edges as denoted at 30 and 31. The teeth 27 of clutch member 21 are chamfered along their top edges on both sides as denoted at 32 and 33. The chamfered portions 30 and 31 of the teeth of clutch member 20 are longitudinally convex, while the chamfered portions 32 and 33 of clutch member 21 are longitudinally concave.

The sides 24 and 25 of the teeth of clutch member 20 are of zero pressure angle and straight profile shape, having their profiles extending parallel to clutch axis 23. The sides 28 and 29 of clutch member 21 are also of zero pressure angle and straight profile shape, also having their profiles extending parallel to clutch axis 23. The sides 24 and 25 of clutch member 20 are convex cylindrical surfaces of revolution and the sides 28 and 29 of clutch member 21 are concave cylindrical surfaces of revolution. The chamfer surfaces 30 and 31 of clutch member 20 are helicoidal surfaces of convex profile shape; and the chamfer surfaces 32 and 33 of clutch member 21 are also helicoidal surfaces of convex profile shape. The teeth of both clutch members have well rounded fillets at their roots, as denoted at 36 and 37, respectively.

The nature of the helicoidal chamfered surfaces is illustrated in Figs. 16 and 17 which show a chamfered surface 31 of a tooth of clutch member 20. $p_1$, $p_2$, $p_3$ and $p_4$, respectively (Fig. 16), are the lines of intersection with the chamfered surface 31 of equi-spaced parallel planes I, II, III and IV, respectively (Fig. 17), which are perpendicular to the clutch axis 23. Curves $p_1$, $p_2$, $p_3$ and $p_4$ are radial of the clutch axis 23 at points in their lengths which are equi-distant from the clutch axis 23, as indicated in the cases of mean points $P_1$ and $P_4$ in Fig. 16. Lines 34 and 35, tangent to curves $p_1$ and $p_4$ at the points $P_1$, $P_4$, respectively, intersect in the clutch axis 23. Surface 31 is a surface twisted three-dimensionally. It is a helicoidal surface of varying lead.

By "varying lead" is meant that the inclination of the chamfer, considered in profile, as in Fig. 17, changes from top to bottom. At the top of its profile the chamfer is inclined at a much larger angle to clutch axis 23 than at the bottom of its profile. In fact at the bottom of its profile the chamfer merges into the tooth side surface 25 and hence at this point is parallel to, or has zero inclination to, the axis 23. Considered from a different viewpoint, the "varying lead" helicoidal shape of the chamfers means that as the mating clutch members are rotated about axis 23 and simultaneously moved axially therealong, with their chamfers in contact, so as to bring the tooth side surfaces into mesh, the rate of the axial motion varies (increases) in relation to the rate of the rotational motion. After the tooth side surfaces have thus been brought into engagement there is no further rotation, and the clutch members move only axially until their teeth come into full depth mesh.

For cutting and chamfering the teeth of clutch member 20, a face mill cutter 40 may be used. This cutter, which is shown more or less diagrammatically, has a plurality of blades 41 which are arranged circularly about its axis 42 and which have cutting portions that project beyond one side face of the cutter in the general direction of the axis of the cutter. Each blade 41 has a straight side cutting edge 43, a convex chamfering edge 44, and a tip cutting edge 45. It may also have an outside cutting edge 46. Chamfering edge 44, which is preferably of circular arcuate shape, connects the side-cutting edge 43 with the tip-cutting edge 45. The insides of the blades are the finishing portions and the outsides are just to remove stock. The outside edges therefore may be, and usually are, placed on separate blades which may alternate with the blades having the inside cutting edges.

The cutter 40 is positioned with its axis 42 parallel to the axis 23 of the clutch so that it will operate in two spaced tooth zones of the work simultaneously.

One of the blades 41 of the cutter is shown in full lines in Fig. 3 at the beginning of the cut on the chamfered portion $30a$ of a tooth $22a$ of the work. As the cutter revolves on its axis, a relative helicoidal movement is produced between cutter and work until the cutter reaches the dotted line position denoted at $41'$. Then the relative helicoidal motion between the rotating cutter and the work ceases but the depthwise feed component is continued until the cutter reaches full depth position. This position is shown in Figs. 1 and 2. During the depthwise feed movement, opposite sides of two spaced teeth of the work, such as the sides $24a$ and $25b$ of the teeth $22a$ and $22b$, respectively, of the clutch member, are cut as parts of a common cylindrical surface whose axis coincides with the axis 42 of the cutter. In full depth position, these sides and the root portions 16 of the teeth are finished. Then the depthwise feed movement is reversed, causing withdrawal of the cutter from full depth position. After the cutter has been partially withdrawn and the cutter has reached a position with respect to the side $25b$ of tooth $22b$ corresponding to that shown in dotted lines at $41'$ in Fig. 3, the helicoidal motion is started again, by adding to the feed component the turning component, so that the chamfer surface $31b$ may be produced on the tooth $22b$ in the further withdrawal movement. When the cutter has cleared the work, the blank is indexed, and the cycle starts anew.

In order that the chamfer surfaces of mating clutch members be able to carry heavy loads, the first and main requirement is that the mating chamfered portions of the engaging clutch members be so shaped that the chamfered portions will contact at mean points in the length of said chamfered portions. This may be fulfilled when the mating chamfered portions of the teeth of the engaging clutch members have the same lengthwise direction at mean points in a plane perpendicular to the clutch axis, for instance, a radial direction. Secondly, it is desirable that these conditions of contact be fulfilled not only at a mean point in the length of the chamfered part of a tooth, but at other points in the considered plane as well. Thirdly, it is desirable that the contact between the chamfered portions of the engaging clutch members extend lengthwise of the teeth for a sufficient distance to carry the loads, but preferably not to the ends of the teeth.

In the full line position of the blade 41 in Fig. 3, the convex cutting edge 44 of the blade contacts with the chamfered portion 30a of the tooth 22a at point 50. This point has a distance r measured radially of the cutter from cutting edge 43 and a radial distance t from the side 24a of the tooth. The points in the cutting edges of the tool, which are adapted to make contact at point 50, are all located in a circle 52 which is shown in dotted lines in Fig. 1. The radius of this circle exceeds by the distance r the radius of the circle 53, which contains the points in the side cutting edges 43, which are adapted to cut the tooth side 24a. The circle 53 in the full depth position shown in Fig. 1 is tangent at mean point 54 to a line 55 radial of the clutch axis 23.

It is obvious that in the full depth position shown in Fig. 1 the circle 52 is not radial of the clutch axis at mean clutch radius 23—54. However, our object of obtaining chamfer surfaces on the clutch member 20, which will be radial of the clutch axis at mean points in their lengths, is attained when the circles, like circle 52, containing points of contact between the cutter and a chamfer surface are radial of the clutch axis in their respective positions of contact during partial depthwise engagement of the cutter and clutch member. This requisite is fulfilled for the considered point 50 when the cutter is displaced along its radius 54—42 a distance r so that its axis moves from position 42 to position 42a and the circle 52 will pass through point 54 and be tangent to clutch radius 23—54, and when the cutter is further moved relatively about the clutch axis 23 through an angle 54—23—50 until the circle 52 passes through a considered point of contact 50 on the chamfered surface 30a of the clutch tooth. In this last described turning motion about the clutch axis, the cutter center moves to position 42′, angle 42′—23—42a being equal to angle 54—23—50. The position 42′ of the cutter axis is coordinated with the depth feed position of the cutter as will be obvious, for the position 42′ of the cutter axis corresponds to the position where the cutter makes contact with the chamfer surface 30a in point 50 of that surface.

Other angular positions of the cutter axis for other depth-feed positions of the cutter and for other points of contact between the cutter and the chamfer surface to be produced can be obtained in the same way as described for determining the position 42′. The various relative positions of the cutter axis for different points of contact between the cutter and the chamfer surface being produced constitute a curve 42—42′ shown in dotted lines in Fig. 1.

In the production of the chamfer surface 30a, then, the cut starts in the position shown in full lines in Fig. 3, with the cutter axis at position 42′ (Fig. 1). As the in-feed proceeds, a relative generating movement is effected between the cutter and the work so that the cutter axis moves relatively toward position 42 which is attained when the in-feed has proceeded far enough for the cutter to have attained the dotted line position 41′ shown in Fig. 3. From this point, the movement of translation is stopped but the in-feed continues, preferably at a uniform rate until depth position is nearly reached. Then the in-feed slows down and when full depth position is attained, which is the position where the sides 24a and 25b are completed, it is reversed. When the cutter has again reached the position shown at 41′ on the out-feed, the generating movement is again started in the same direction as before and the generation of the chamfer surface 31b of tooth 22b starts. As the out-feed continues, preferably at a uniform rate, the cutter axis moves along a curve 42—42″ (Fig. 1), until the chamfer surface 31b has been completed. The curve 42—42″ may be determined for the chamfer surface 31b in the same manner as the curve 42—42′ was determined for the chamfer surface 30a. The curve 42—42″ will be a curve symmetrical to the curve 42—42′ with respect to the axial plane 23—42, if the chamfered surfaces on opposite sides of the teeth of the clutch member have the same profile shape.

The described relative movement of the cutter axis from position 42′ to position 42 and then to position 42″ may be resolved into a turning motion of the work on its axis 23, and a radial displacement of the cutter axis in the plane 23—42. Thus position 42″ may be arrived at by turning the work through an angle 42—23—42″, and by moving the cutter axis outwardly from position 42 to position 42b. This latter point lies on circle 51 which passes through point 42″. Thus the motions required for generation of the chamfer surfaces may be resolved into three coordinated relative motions. These are the depthwise feed movement in the direction of the clutch axis; relative turning motion about the clutch axis, and a rectilinear motion in the plane containing the clutch and cutter axes. The depth feed movement is preferably at a uniform rate. The turning motion will depend upon the mechanism employed to rotate the blank. The rectilinear motion will depend on the turning motion.

A Geneva motion may be conveniently employed for the turning motion, since it can be used not only for rotation of the work intermittently for chamfering but also for rotation of the work intermittently for indexing. The turning motion determines the nature of the profile of the chamfer surface, and determines, also, the linear feed motion required, since this motion should be of the same nature as the turning motion. Considerable latitude prevails, therefore, in selecting the profile shape of the chamfer surface since this shape can be chosen with reference to the indexing motion available.

The method of generating the clutch member 21, which is to mate with clutch member 20, is shown in Figs. 4, 5 and 6. A face mill cutter 60 is used which has blades 61 arranged circularly about its axis 62. These blades have outside cutting edges 63 of straight profile and zero pressure angle and convex chamfering edges 64. The stocking-out edges 66, which serve simply to remove stock, may be on the same blades as the outside edges 63, as shown, or on separate blades.

The cutter 60 is so positioned with reference to the work that it will operate simultaneously in two spaced tooth zones of the work and its axis is placed parallel to the axis 23 of the work so as to cut side tooth surfaces on the work of zero pressure angle. The diameter of the cutter is selected so that a tangent to a side tooth surface produced, as, for instance, the tangent 65 to the side tooth surface 29a of tooth 27a at mean point 64 will be radial of the clutch axis 23. Then the mating side tooth surfaces of the two clutch members 20 and 21 will have the same lengthwise direction and proper contact. The motions required to produce chamfer surfaces on clutch member 21, which will have the same lengthwise direction (radial) at mean points as the chamfer surfaces of clutch member 20, can be determined in the same way as already described for clutch member 20.

A blade 61 of the cutter is shown in Fig. 6 in position at the beginning of production of the chamfer surface 33a. 70 is a point of contact between the convex cutting edge 64 of the blade and the convex chamfer surface 33a to be produced. The point of contact 70 lies inside of the side cutting edge 63 of the blade at the radial distance $r'$ and outside of the straight profile 29 of the tooth at the radial distance $t'$. The points in the chamfering edges 64 of the cutter, which are adapted to cut at point 70 of the chamfer surface, all lie on a circle 72 (Fig. 4). In Figs. 4 and 5, the cutter is at full depth position and points in the side cutting edges 63 of the blades are finishing the sides 29a and 28b of the spaced teeth 27a and 27b, respectively, of the work. To determine the position which the cutter should occupy in order to have the mean point 70 radial of the clutch axis when the chamfering edge 64 and the chamfer surface 33a contact at point 70, the axis of the cutter is displaced from position 62 in Fig. 4 first to a position 62a along line 64—62 until circle 72 is tangent to a clutch radius 23—64 at point 64, and then the cutter is moved about the clutch axis 23 through an angle 64—23—70 to bring the circle 72 into contact with the chamfer surface 33a at point 70. The distance 62—62a is equal to $r'$ that is, to the distance between circles 72 and 73.

When the circle 72 of the cutting points is tangent to the radial line 23—70, the axis of the cutter will be at point 62'. This is the position of the axis of the cutter at the start of the cut, then, on the chamfer surface 33a. In producing the chamfer surface 33a, then, the cutter is rotated on its axis while a relative movement is produced between the cutter and the work in such way as to move the cutter axis from position 62' to position 62 and in time therewith a relative depthwise feed movement is produced between the cutter and the work.

When the cutter has been fed relative to the blank to a position where the cutting edge 64 of the cutter makes contact at point 71 (Fig. 6), the chamfer surface 33a will have been completed. The relative generating motion between cutter and work is then stopped, but the depthwise feed movement is continued to produce the opposite sides 29a and 28b of the spaced teeth 32a and 32b. Then the withdrawal motion of the cutter starts. When the cutter has been partially withdrawn to a point where the convex cutting edge 64 of the cutter is making contact with the tooth side 28b at a point in the height of that tooth side corresponding to point 71, the generating motion is started again, the turning motion about the clutch axis being in the same direction as during chamfering of surface 33a. Then, as the generating motion continues in time with the out-feed movement, the convex cutting edges 64 of the cutter will generate the chamfer surface 32b. In this movement, the axis of the cutter will move from position 62 to position 62''.

The relative motion of cutter and work in generation of the chamfer surfaces of clutch member 21 may be split up, as in the case of the chamfer surfaces of clutch member 20, into a radial displacement of the cutter axis in the axial plane 23—62, into a turning motion about the clutch axis 23 and into depthwise feed in the direction of the clutch axis. Thus the cutter axis, in effect, is gradually moved to a maximum center distance 23—62 at which the opposite sides of spaced teeth of the clutch are cut, and then back again. This is the reverse of the motion of the cutter in the cutting of the mating clutch member 20, for in the cutting of member 20, the cutter is gradually moved to a minimum center distance 23—42 at which the sides are cut, and then back again.

In the above described embodiment of the invention, the mating chamfer surfaces as well as the mating sides of the teeth of the clutch members all extend radially of the clutch axis 23 at mean points in their lengths, that is, they are all tangent to lines which extend radially of the clutch axis at a given radial distance, namely, distance 23—54 in the case of clutch member 20 and distance 23—64 in the case of clutch member 21. The distances 23—54 and 23—64 are equal. It is not necessary, however, that the mating sides and mating chamfered surfaces extend radially of the clutch axis. The tangents to these surfaces may be non-radial of the clutch axis providing that these tangents all have the same distance from the clutch axis and all lie on the same side of the clutch axis when the clutch members are in engagement. When looking at the fronts of the two clutch members, this means that the tangents should be offset the same distance at opposite sides of the clutch axis.

In a still broader aspect, the tangents may have varying distances from the clutch axis providing that mating points of the two clutch members have tangents at the same distance from the clutch axis and offset at the same side of the clutch axis when the clutch members are in engagement. Mating points are simply points where the surfaces of the clutch teeth have the same pressure angle, for instance points 50 and 70.

In the above described embodiment of the invention, the chamfer surfaces join the straight side surfaces of the teeth of the clutch members smoothly without break. When contact between the cutter and the work is made, for instance, at the point of juncture 51 (Fig. 3) between the chamfer surface 30a and the side tooth surface 24a, the cutter axis is in the same position 42 as when cutting the tooth sides.

The cutters 40 and 60 have the disadvantage that their side-cutting edges are of zero pressure angle and must be radially as well as axially relieved. Hence, when the blades are sharpened, the blades must be adjusted radially in the cutters in order to compensate for the change in radial position of the cutting edges. This disadvantage can be overcome, for I have found a way of using cutters having side cutting edges of positive pressure angle which are axially relieved. Preferably, then, face clutch members are cut according to this invention with cutters of the type shown in Figs. 7 to 11 inclusive. These figures illustrate the production of two mating clutch members 80 and 81.

Clutch member 80 has teeth 82 whose sides 84 and 85 are of longitudinally convex shape and whose chamfer surfaces 90 and 91 are also of longitudinally convex shape. The tooth sides 84 and 85 are convex cylindrical or conical surfaces of straight profile and zero pressure angle and the chamfer portions are helicoidal surfaces of convex profile and varying lead. Member 81 has teeth 87 whose sides 88 and 89 are longitudinally concave and whose chamfer surfaces 92 and 93 are also longitudinally concave. The tooth sides 88 and 89 are concave cylindrical or conical surfaces of straight profile and zero pressure angle. The chamfer surfaces 92 and 93 are ordinarily helicoidal surfaces of convex profile.

The teeth of clutch member 80 are cut with a face mill cutter 100 which finishes with its inside cutting blades 101. The blades 101 are arranged circularly about the axis 102 of the cutter to extend in the direction of said axis, and they have cutting profiles consisting of a straight side cutting edge 103 and a convex chamfering edge 104. The side cutting edges 103 are inclined at a positive pressure angle to the cutter axis 102 and so are all the elements of the chamfering edges 104. This means that the cutter 100 can be relieved axially and will hold its diameter and shape after sharpening. It means, also, that the cutting tool may readily be made in the form of an annular grinding wheel if desired.

The cutter 100 is tilted outwardly with reference to the clutch blank so that the conical surface described by its straight side-cutting edges 103 will be of zero pressure angle at mean points 98 and 99 in the two tooth zones in which the cutter operates. The cutter axis 102 will then intersect the clutch axis 83 when extended.

The position of the cutter relative to the blank and the relative movements of cutter and blank can be determined according to the same principles as described with reference to Figs. 1 to 6 inclusive. The profile of a cutter blade 101 is shown in full lines in Fig. 9 at the beginning of the cut when the cutting edge 104 is in contact with the chamfered portion 90a of a tooth 82a of the work at point 110. Again in the generation of the chamfer surfaces of the clutch member, the feed can be resolved into three motions, namely, motion along and about the clutch axis 83 and a lateral feed motion in the plane of the cutter and clutch axes. If the cut starts, as shown in Fig. 9, at the top of the chamfered surface 90a, the work 80 turns in a clockwise direction about its axis 83 at a gradually decreasing rate as the depth feed proceeds inwardly. At the same time, the cutter is moved radially toward the clutch axis 83 also at a gradually decreasing rate. In the turning and radial movements, a point of the cutter axis moves from 105' to 105. When the central position 105 is reached and the cutter blade has attained the dotted line position 103' of Fig. 9 the chamfer is completed. At the dotted line position 103' (Fig. 9) contact between the chamfering edge 104 of the cutter and the chamfer surface 90a of the clutch tooth is at point 111. Then the turning motion of the work on its axis comes to a stop and the work is held stationary on its axis while the depthwise feed movement continues until the cutter has reached full depth position. During this depthwise feed movement to full depth position, the tooth sides 84a and 85b of spaced teeth of the work are finished. Then the depthwise feed movement is reversed and the cutter is withdrawn outwardly. When the cutter has been withdrawn to a position corresponding to the dotted line position shown at 103' in Fig. 9, the work resumes its turning motion in the clockwise direction but at a gradually increasing rate. At the same time, and also at a gradually increasing rate, the cutter axis is moved laterally away from the work axis 83 so that point 105 in the cutter axis will move to position 105". The chamfer of surface 91b is completed when the cutter has returned to a position corresponding to that shown in full lines in Fig. 9. When the cutter is clear of the work, the work is indexed, and then the cutting cycle begins anew.

Fig. 9 shows the path 112 of movement of the center 113 of convex cutting edge 104 during chamfering and cutting of the opposite sides of spaced teeth of the work. The chamfer surface 90a is generated during movement of the center of the cutting edge from 113 to 113'. The tooth sides 84a and 85b are finished when the center of the cutting edge 104 is in full depth position 113". The chamfering of surface 91b begins when the cutter has been withdrawn so that the center of its cutting edge 104 is again at 113', and this chamfer surface is completed when the center of the convex cutting edge 104 has reached position 113''' on the left branch of path 112.

In Fig. 9, the path 112 is shown as curved instead of straight between points 113' and 113". This is to obtain a partly sidewise approach to full depth position so that the straight tooth sides 84a and 85b may be formed with the straight side-cutting edges 103 of the cutter. The surfaces 84a and 85b lie, then, in the same conical surface, which is a counterpart of the conical cutting surface of the cutter. Movement of the cutter along the curved path 113'—113" has the added advantage that it prevents rubbing of the cutter on the finished side tooth surfaces of the work during the out-feed movement. In the out-feed movement the distance 113"—113 may be traveled at an increased rate, if desired.

Fig. 9 illustrates an embodiment of the invention where the chamfer profile 90a joins the side tooth surface 84a smoothly. The positions 113' and 113" are then aligned depthwise with one another and are at the left of point 113, that is, they have the same distance from side tooth surface 84a. If a slight angle is admitted at the juncture of the chamfer surface with the side surface of a tooth, then the path 112 need have no break, but may proceed smoothly from point 113 to point 113".

The curve between points 113' and 113" is obtained solely by lateral feed of the cutter toward the work axis 83 without turning motion of the work. Thus point 105 in the cutter axis may assume an intermediate position as shown exaggerated at 105a in Fig. 7.

It is also possible to envelop the straight profile 84a (Fig. 9) with the rounded cutting edge 104 by effecting simple straight line axial feed movement between points 113' and 113". In this case the resultant tooth sides will be cylindrical surfaces terminating at inclined root lines 106 (Fig. 8). In this case the convex cutting edge 104 will be slightly prolonged, and straight cutting edge 103 will be given a slightly smaller positive pressure angle than shown. Path 113'—113" (Fig. 9) will be straight then for the feed in one direction as for the in-feed, but may retain the shape shown for the feed in the opposite direction, as for the out-feed.

The clutch member 81, which is to mate with clutch member 80, is cut in a manner similar to clutch member 80. A face mill cutter 120 is employed that has its cutting blades 121 extending in the general direction of its axis 122. The blades 121 have outside cutting edges 123 of positive pressure angle and chamfering edges 124 of convex profile shape. The cutter 120 is tilted inwardly with respect to the work and produces somewhat inclined tooth space bottoms 126 which match the direction of the inclined tooth bottoms 106 of clutch member 80. The tops 107 and 127 of the teeth of the two clutch members are preferably turned to follow the same general direction as their tooth bottoms.

In the embodiment illustrated, the outside diameter of cutter 120 is equal to the inside diameter of the cutter 100. In this case, the mating tooth sides of the two clutch members match each other along their whole length. It is possible, however, to reduce the lengthwise contact between the teeth of the clutch members and have that contact ease off at the tooth ends by reducing the diameter of the cutter 100 as compared with the diameter of the cutter 120. Thus, the diameter of cutter 100 may be reduced so that one less tooth is skipped between the two tooth zones in which the cutter operates.

In producing the clutch member 81, opposite sides of spaced teeth of the clutch member and the chamfer surfaces at these sides of the teeth are again cut in a single cycle of operation. This cycle again comprises depthwise in-feed followed by depthwise out-feed along the clutch axis 83 intermittent turning motion at a varying velocity in one direction about said axis, and intermittent radial feed motion of the cutter first in one direction and then in the other in a plane containing the cutter and clutch axes. The cutter is so moved in this last named movement that a point of its axis moves outwardly from 125' to 125 in the cutting of the chamfer surface 93a, and inwardly from position 125 to 125'' during the chamfering of chamfer surface 92b. Here again, the cutter may be moved on a path similar to that shown in Fig. 9 so that it approaches the side tooth surfaces 89a and 88b, which are to be cut, from a lateral direction and effects a smoother cut.

The invention is not limited to the production of clutch members having chamfer surfaces of convex profile shape, nor is it limited to the production of clutch members having chamfer surfaces which are helicoidal surfaces of varying lead. Fig. 14 illustrates diagrammatically a modification of the invention in which a clutch member is produced whose teeth 130 have chamfered surfaces 131 and 132 at opposite sides thereof that are straight profile. But one member of the clutch pair is shown in this figure. The chamfer surfaces of this member may be produced with a face mill cutter 135 that has inside cutting blades 136 which have inside edges 137 and rounded top edges 139. The inside edges 137 are of straight profile and they have sharp cutting points 138 formed at their junctures with the rounded convex top edges 139. At the intersection point 138, the rounded edge 139 has an inclination such that it includes a small angle with the chamfer surface being cut, as is clearly shown in the dotted position 136' of the blade. In this embodiment of the invention, no lateral feed of the cutter is required. The generating motion may consist simply of movement along and about the clutch axis. With this embodiment, however, more cuts, that is, more revolutions of the cutter, are required to produce an acceptable finish. The chamfer surface produced may be a helicoid of constant lead and the movements about and along the clutch axis may therefore be at uniform rates.

The same tooth chamfer 131 of constant lead may also be produced by cutters, such as 100 and 120, having well rounded chamfering edges. In this case the uniform lead of the chamfers is produced with a constant radial position of the cutter, which is different from the radial position at which the straight side profiles are finished, as is clear from the foregoing description.

In Figs. 3, 6 and 9, chamfer surfaces are shown which have profiles that are convex and moderately curved at their middle portions and more curved at their junctures with the sides of the teeth. In Fig. 15, a further modification of the invention is illustrated. Here a clutch tooth 140 is shown which has chamfer surfaces 141 and 142 that are of circular arcuate profile shape.

While the invention has been described in connection with clutch members having longitudinally curved teeth, it will be understood that in its broad aspects, it is also applicable to clutches having longitudinally straight teeth. Further, it will be understood that it is not limited in application to clutch members having side tooth surfaces of zero pressure angle but may be applied also to clutch members of positive pressure angle, although ordinarily its use is confined to clutch members of low pressure angle. Still further, it will be understood that while I have described the invention in connection with clutch pairs of which one member has side tooth surfaces that are logitudinally concave and the other member has side tooth surfaces that are longitudinally convex, both members may be made with longitudinally convex side tooth surfaces if quite restricted localization of tooth contact is desired.

It will be further understood that while a number of different embodiments of the invention have been described, the invention is capable of still further modification, and this application is intended to cover any variations, uses, or adaptations of the invention, following, in general, the principles of the invention and includig such departures from the present disclosure as come within known or customary prectice in the art to which the invention pertains and as may be applied to the essential features hereinbefore set forth and as fall within the scope of the invention or the limits of the appended claims.

Having thus described my invention, what I claim is:

1. A pair of toothed face clutch members whose teeth are chamfered along their top edges, the chamfered portions of the teeth of each member being helicoidal surfaces conjugate to the chamfered portions of the teeth of the other member.

2. A pair of toothed face clutch members whose teeth are chamfered along their top edges, the chamfered portions of the teeth of each member being helicoidal surfaces of varying lead conjugate to the chamfered portions of the teeth of the other member, and the mating chamfered portions of the two members having the same lengthwise direction at points of contact.

3. A pair of toothed face clutch members whose teeth are chamfered along their top edges, the chamfered portions of the teeth of each member being helicoidal surfaces of varying lead which are conjugate to the chamfered portions of the teeth of the other member and which are radial of the axis of the member at mean points in the chamfered surfaces.

4. A pair of toothed face clutch members whose teeth have longitudinally curved side surfaces and are chamfered along their top edges, the chamfered portions of the teeth of each member being helicoidal surfaces of convex profile shape conjugate to chamfered portions of the teeth of the other clutch member.

5. A pair of toothed face clutch members whose teeth have longitudinally curved side surfaces and are chamfered along their top edges, the chamfered portions of the teeth of each clutch member being helicoidal surfaces of varying lead and convex profile shape.

6. A pair of toothed face clutch members whose teeth are chamfered along their top edges, the chamfered surfaces of the teeth of both members being helicoidal surfaces, the chamfered surfaces of the teeth of one member being longitudinally convex in shape, and the chamfered surfaces of the teeth of the other member being longitudinally concave in shape.

7. A pair of toothed face clutch members whose teeth are chamfered along their top edges, the chamfered surfaces of the teeth of both members being helicoidal surfaces of convex profile, the chamfered surfaces of the teeth of one member being longitudinally convex in shape, and the chamfered surfaces of the teeth of the other member being longitudinally concave in shape.

8. A pair of toothed face clutch members, each of which has teeth that are longitudinally curved and that are chamfered along their top edges, the side surfaces of the teeth of each member being radial of the clutch axis at mean points in their lengths and the chamfered portions of the teeth of each member being also radial of the clutch axis at mean points in their lengths, the chamfered surfaces of each member being helicoidal surfaces.

9. A pair of toothed face clutch members whose teeth are chamfered along their top edges, the chamfered portions of the teeth of each member being helicoidal surfaces, opposite sides of spaced teeth of each member being parts of a common surface of revolution, mating sides of the teeth of the two members having the same lengthwise direction at points of contact, and the mating chamfered surfaces of the two members having the same lengthwise direction at points of contact.

10. A pair of toothed face clutch members whose teeth are chamfered along their top edges, the sides and chamfered portions of the teeth of one member being longitudinally convex in shape and the sides and chamfered portions of the teeth of the other member being longitudinally concave in shape, opposite sides of spaced teeth of each member being parts of a common surface of revolution, and the chamfered portions at opposite sides of the teeth of each member being in the form of generated helicoidal surfaces of varying lead conjugate to the chamfered surfaces of the other member.

11. A pair of toothed face clutch members whose teeth are chamfered along their top edges, the sides and chamfered portions of the teeth of one member being longitudinally convex in shape and the sides and chamfered portions of the teeth of the other member being longitudinally concave in shape, opposite sides of spaced teeth of each member being of straight profile and extending at points intermediate their ends in the direction of the axis of said member and being parts of a common conical surface, and the chamfered portions at opposite sides of the teeth of each member being of convex profile shape and having the shape of generated helicoidal surfaces of varying lead conjugate to the chamfered surfaces of the mate member.

12. A pair of toothed face clutch members whose teeth have longitudinally curved sides and are chamfered along their top edges, the chamfers of each member being helicoidal surfaces conjugate to the chamfers of the other member, and mating chamfers having the same directions, both profilewise and lengthwise, at mean points along the length thereof, whereby they may contact at such mean points.

13. A pair of toothed face clutch members whose teeth are chamfered along their top edges, the chamfers of each member being helicoidal surfaces conjugate to the chamfers of the other member, and mating chamfers having the same direction, relative to the common axis of the two members, in planes perpendicular to said axis through corresponding mean points along the length of the mating chamfers at which their pressure angles are equal.

14. A pair of toothed face clutch members whose teeth are chamfered along their top edges, opposite sides of spaced teeth of each member being parts of a common surface of revolution, the chamfers of both members being helicoidal surfaces, and mating chamfers being tangent to each other at mean points along the length thereof in the various relative positions of the members in which the mating chamfers contact.

ERNEST WILDHABER.

References Cited in the file of this patent

UNITED STATES PATENTS

| Number | Name | Date |
| --- | --- | --- |
| 2,384,582 | Wildhaber | Sept. 11, 1945 |
| 2,384,583 | Wildhaber | Sept. 11, 1945 |
| 2,384,584 | Wildhaber | Sept. 11, 1945 |
| 2,443,089 | Wildhaber | June 8, 1948 |